US012759524B2

(12) United States Patent
Madzgalla et al.

(10) Patent No.: US 12,759,524 B2
(45) Date of Patent: Oct. 13, 2026

(54) ACTUATOR ASSEMBLY

(71) Applicants: ZF Active Safety GmbH, Koblenz, DE (US); ZF Active Safety US Inc., Livonia, MI (US)

(72) Inventors: Lukas Madzgalla, Lahnstein (DE); Florian Roessinger, Neuwied (DE); Michael Weins, Münstermaifeld (DE); Galus Chelaidite, South Lyon, MI (US); Marco Becker, Oberdürenbach (DE)

(73) Assignees: ZF ACTIVE SAFETY US INC., Livonia, MI (US); ZF ACTIVE SAFETY GMBH, Koblenz (DE)

( * ) Notice: Subject to any disclaimer, the term of this patent is extended or adjusted under 35 U.S.C. 154(b) by 399 days.

(21) Appl. No.: 18/483,599

(22) Filed: Oct. 10, 2023

(65) Prior Publication Data

US 2025/0115227 A1 Apr. 10, 2025

(51) Int. Cl.
*F16D 55/226* (2006.01)
*B60T 13/74* (2006.01)
(Continued)

(52) U.S. Cl.
CPC ............ *B60T 13/746* (2013.01); *F16D 65/18* (2013.01); *B60T 1/065* (2013.01); *F16D 55/226* (2013.01);
(Continued)

(58) Field of Classification Search
CPC ...... B60T 13/746; B60T 1/065; F16D 55/226; F16D 65/18; F16D 2121/24; F16D 2125/40
See application file for complete search history.

(56) References Cited

U.S. PATENT DOCUMENTS 6,938,735 B1 * 9/2005 Hilzinger ................ F16D 65/18 188/162
11,821,479 B2 * 11/2023 Chelaidite ............. F16D 55/226
(Continued)

FOREIGN PATENT DOCUMENTS

DE 10064901 A1 10/2001
DE 10142644 A1 4/2003
(Continued)

OTHER PUBLICATIONS

Corresponding German Patent Application No. 102024128794.2, Search Report dated May 27, 2026.

*Primary Examiner* — Thomas W Irvin
(74) *Attorney, Agent, or Firm* — Tarolli, Sundheim, Covell & Tummino LLP

(57) ABSTRACT

An actuator assembly (12), in particular for an electromechanical vehicle brake (10), is specified, having a brake caliper (14) in which an intermediate space (16) is present for receiving a brake rotor (18), a ball screw drive which has an actuating slide (24) for applying a brake pad (20) onto the brake rotor (18) and an electromotively driven spindle (26) for the axial movement of the actuating slide (24), wherein the actuating slide (24) can be moved by axial displacement between an extended position and a retracted position. The spindle (26) has a spindle shaft (28) and an output sleeve (30) which is separate from the spindle shaft (28) and which is arranged in toothed and torque-transmitting engagement on the spindle shaft (28). A threaded raceway (32) is formed on the external peripheral surface of the output sleeve (30) and an opposing raceway (34) for balls is formed on the internal peripheral surface of the actuating slide (24).

16 Claims, 3 Drawing Sheets

(51) Int. Cl.

| | |
|---|---|
| ***F16D 65/18*** | (2006.01) |
| *B60T 1/06* | (2006.01) |
| *F16D 121/24* | (2012.01) |
| *F16D 125/40* | (2012.01) |

(52) U.S. Cl.
CPC ...... *F16D 2121/24* (2013.01); *F16D 2125/40* (2013.01)

(56) References Cited

U.S. PATENT DOCUMENTS 12,241,513 B2 * 3/2025 Gerber ................ B60T 8/17613
12,449,008 B2 * 10/2025 Baek ..................... F16D 55/226
2006/0131113 A1 * 6/2006 Christof .................... B60T 8/00 188/72.1
2011/0315492 A1 * 12/2011 Sakashita ................ F16D 65/18 188/72.1
2018/0058553 A1 * 3/2018 Kick-Rodenbuecher .................... F16H 25/2015
2022/0324427 A1 * 10/2022 Puiu ........................ F16D 65/18
2023/0150471 A1 * 5/2023 Knop .................. F16D 65/0971 188/72.8
2023/0151863 A1 * 5/2023 Knop ...................... F16D 65/18 188/72.1
2023/0175564 A1 * 6/2023 Gerber ................ B60T 8/17613
2023/0220895 A1 * 7/2023 Chelaidite ............. F16D 65/183 475/5
2023/0258237 A1 * 8/2023 Park ...................... F16D 55/226 188/71.1
2023/0271596 A1 * 8/2023 Jung ..................... F16D 65/183
2024/0301933 A1 * 9/2024 Chelaidite ............. F16D 55/226
2024/0400026 A1 * 12/2024 Chelaidite ............... F16D 65/18
2026/0009437 A1 * 1/2026 Chelaidite ............... F16D 65/18

FOREIGN PATENT DOCUMENTS

DE 102009036884 A1 5/2011
DE 102011050814 B3 8/2012
DE 102011005517 A1 9/2012

* cited by examiner

ACTUATOR ASSEMBLY

TECHNICAL FIELD

The invention relates to an actuator assembly, in particular for an electromechanical vehicle brake.

BACKGROUND

Actuator assemblies in vehicle brakes serve to apply a brake pad onto a brake rotor. To this end, the actuator assembly generally has a spindle drive which has an actuating slide and an electromotively driven spindle for the axial movement of the actuating slide, wherein an axial feed force is transmitted from the actuating slide to the brake pad for applying the brake pad onto the brake rotor.

When the vehicle brake is actuated, high transverse forces act on the brake pad and the actuating slide, whereby a bending moment is produced in the actuator assembly. The bending moment can lead to the deflection of the brake caliper. In this case some parts of the actuator assembly, for example the spindle, are aligned with the brake caliper while other parts, for example the actuating slide, are aligned with the brake rotor. This results in large radial forces in the actuator assembly, which can lead to increased wear in the long run.

In known actuator assemblies, a spherical bearing plate is arranged on a bearing surface of the spindle facing away from the brake pad. However, the transverse forces in the actuator assembly are only eliminated inadequately due to the relatively long distance from the brake pad.

SUMMARY

It is thus an object of the present invention to specify a solution for avoiding large radial forces in an actuator assembly of a vehicle brake.

This object is achieved according to the invention by an actuator assembly, in particular for an electromechanical vehicle brake, having a brake caliper in which an intermediate space is present for receiving a brake rotor, a ball screw drive which has an actuating slide for applying a brake pad onto the brake rotor and an electromotively driven spindle for the axial movement of the actuating slide, wherein the actuating slide can be moved by axial displacement between an extended position and a retracted position. The spindle has a spindle shaft and an output sleeve which is separate from the spindle shaft and which is arranged in toothed and torque-transmitting engagement on the spindle shaft, wherein a threaded raceway is formed on the external peripheral surface of the output sleeve and an opposing raceway for balls is formed on the internal peripheral surface of the actuating slide. The output sleeve is secured to the spindle shaft, in particular axially and fixedly in terms of rotation.

Since the output sleeve is manufactured separately from the spindle shaft, a relative movement is possible between the spindle shaft and the output sleeve in order to avoid excessive radial forces when the brake caliper is deformed. In particular, transverse forces and bending moments are avoided to a large extent in the actuator assembly, so that less wear occurs and as a result the service life of the actuator assembly is extended. Since transverse forces are avoided, the axial bearings which are present in the actuator assembly are also relieved of load. Power losses due to friction are also reduced, whereby an efficiency of the actuator assembly is optimized.

In a vehicle brake having an actuator assembly according to the invention, a pressure distribution on the brake pad is also particularly uniform, whereby uniform wear is present when viewed over the surface. In other words, oblique wear is avoided.

The two-part manufacture also permits a modular system in which different output sleeves are provided, depending on the load requirements, the output sleeves being connected to an identical spindle shaft. A cost saving in the production of different actuator assemblies can be achieved thereby.

Preferably, in the region of the output sleeve the spindle shaft has an external toothing and the output sleeve has an internal toothing, wherein the external toothing of the spindle shaft is of crowned configuration, such that the output sleeve and the spindle shaft can be tilted relative to one another. The crowned external toothing results in a larger angular offset being possible between the spindle shaft and the output sleeve, so that transverse forces and bending moments can be eliminated in an even more effective manner.

According to one embodiment, a flexible ring adjoining the output sleeve is arranged on both sides of the output sleeve. The flexible rings permit a relative movement of the output sleeve in relation to the spindle shaft and at the same time ensure a defined axial position of the output sleeve on the spindle shaft. Thus it is ensured that the torque-transmitting engagement of the output sleeve with the spindle shaft is maintained.

The flexible rings are positively fastened, for example, to the spindle shaft. As a result, during assembly the flexible rings can be easily mounted in a defined position so that the axial position of the output sleeve is also defined.

According to one embodiment, the flexible rings are axially held in a positive manner in one respectively assigned peripheral recess and/or by means of a locking ring, and can be resiliently compressed when the spindle shaft is tilted relative to the output sleeve. Thus the flexible rings can be mounted in a simple manner. Since the flexible rings are resiliently compressed when the spindle shaft tilts toward the output sleeve, a freedom of movement of the output sleeve is not impaired by the flexible rings.

The output sleeve is clamped axially without clearance between the rings, for example. As a result, the axial position of the output sleeve is particularly accurately defined.

The flexible rings can also serve for compensating for tolerances. In particular, it is conceivable to manufacture the flexible rings with an oversize, wherein during assembly the flexible rings can be adapted to the shape of the surrounding components, since the flexible rings are correspondingly resiliently deformed.

The output sleeve can be axially supported via an axial bearing on the brake caliper or on a housing fastened to the brake caliper, wherein an intermediate element is arranged between the axial bearing and the output sleeve, the intermediate element having on its side facing toward the output sleeve a spherically shaped surface against which the output sleeve bears. The output sleeve has a correspondingly shaped spherical surface. An improved load distribution of the force acting axially on the axial bearing is achieved by such an intermediate element.

A central point of the spherical surface is preferably located in the intermediate space for receiving the brake rotor. As a result, a particularly advantageous curvature of the spherical surface is achieved, in particular, such that the intermediate element does not block a tilting of the output sleeve relative to the spindle shaft.

The spindle shaft is radially supported, for example by means of a slide bearing, on the brake caliper or on a housing fastened to the brake caliper. A slide bearing can be produced particularly simply and cost-effectively, in the simplest case by a bore in the brake caliper.

According to one embodiment, the actuator assembly comprises an electric motor which is coupled in terms of drive to the spindle shaft via a gear unit in order to rotate the spindle shaft, for moving the actuating slide between the retracted position and the extended position. As a result, the actuator assembly is an electromechanical actuator assembly. A sufficiently large force can be generated by means of an electric motor in order to apply a brake pad onto a brake rotor by means of the actuating slide.

BRIEF DESCRIPTION OF THE DRAWINGS

Further advantages and features of the invention are found in the following description and in the accompanying drawings, to which reference is made. In the drawings.

DESCRIPTION

Figure 1:
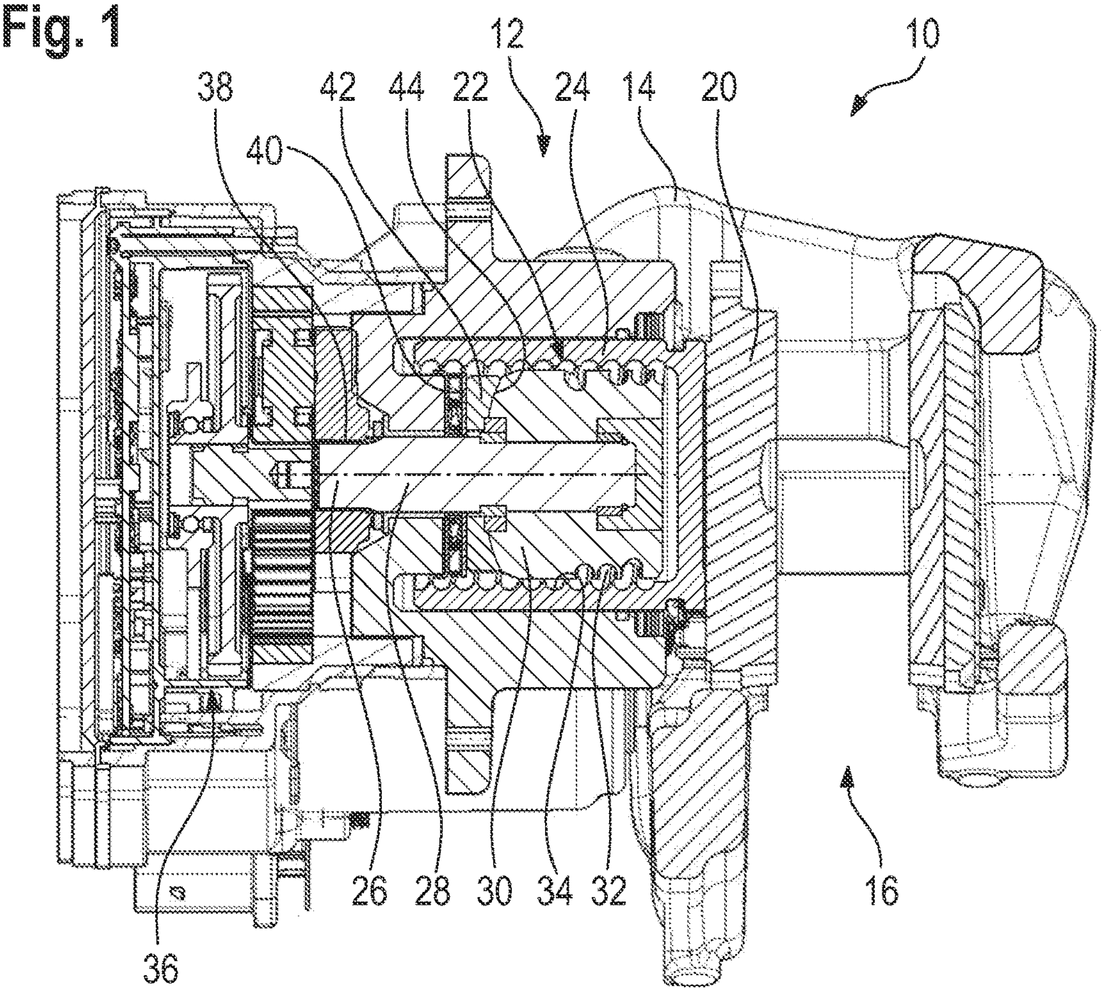
FIG. 1 shows a vehicle brake with an actuator assembly according to the invention.

FIG. 1 shows a vehicle brake 10 with an actuator assembly 12. The vehicle brake 10 is an electromechanically actuatable brake.

Figure 2:
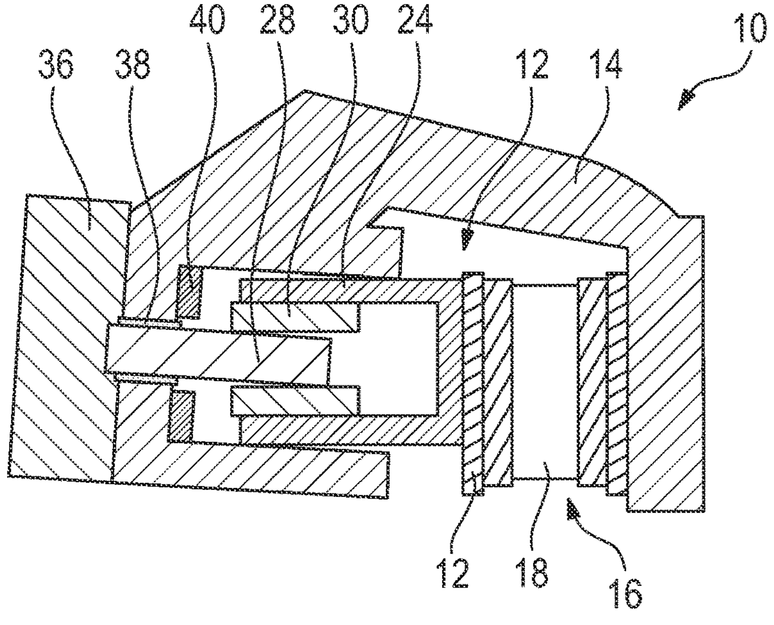
FIG. 2 shows a schematic view of the actuator assembly of FIG. 1.

The actuator assembly 12 comprises a brake caliper 14 in which an intermediate space 16 for a brake rotor 18 is formed (see FIG. 2).

A brake pad 20 which can be applied onto the brake rotor 18 is arranged in the intermediate space.

Moreover, the actuator assembly 12 comprises a spindle drive 22 which in the exemplary embodiment is a ball screw drive.

The spindle drive 22 comprises an actuating slide 24 for applying the brake pad 20 onto the brake rotor 18 and an electromotively driven spindle 26 for the axial movement of the actuating slide 24, wherein the actuating slide 24 can be moved by axial displacement between an extended position and a retracted position.

The actuating slide 24 represents, in particular, a brake piston.

The spindle 26 is divided into two and comprises a spindle shaft 28 and an output sleeve 30 which is separate from the spindle shaft 28 and which is arranged in toothed and torque-transmitting engagement on the spindle shaft 28.

A threaded raceway 32 is formed on the external peripheral surface of the output sleeve 30 and an opposing raceway 34 for balls is formed on the internal peripheral surface of the actuating slide 24. The actuating slide 24 thus represents a spindle nut of the spindle drive 22.

The actuating slide 24 is guided in the brake caliper 14 in a manner which is fixed in terms of rotation.

The actuator assembly 12 also comprises an electric motor which is not visible in the figures.

The electric motor is coupled in terms of drive via a gear unit 36 to the spindle shaft 28 in order to rotate the spindle shaft 28, for moving the actuating slide 24 between the retracted position and the extended position.

Due to the torque-transmitting engagement with the spindle shaft 28, the output sleeve 30 rotates jointly therewith, whereby the balls circulate in the threaded raceway and thereby bring about an axial displacement of the actuating slide 24.

The spindle shaft 28 is radially supported by means of a slide bearing 38 on the brake caliper 14. In the exemplary embodiment, the slide bearing 38 is formed as a cylindrical recess in the brake caliper 14. However, it is also conceivable to provide a bearing bush in the brake caliper 14.

The output sleeve 30 is axially supported via an axial bearing 40 on the brake caliper 14. The axial bearing 40 is, for example, a needle bearing.

An intermediate element 42 is arranged between the axial bearing 40 and the output sleeve 30, the intermediate element having on its side facing toward the output sleeve 30 a spherically shaped surface 44 against which the output sleeve 30 bears. As can be seen in FIG. 1, the output sleeve 30 has a bearing surface which is shaped in a complementary manner to the surface 44.

A central point of the spherical surface 44 is located in the intermediate space 16 for receiving the brake rotor 18.

In an alternative exemplary embodiment, which is not shown for the sake of simplicity, the slide bearing 38 and the axial bearing 40 can be configured in a housing fastened to the brake caliper 14 or supported thereon.

Since the spindle 26 is produced in two parts, a certain relative movement is possible between the spindle shaft 28 and the output sleeve 30. More specifically, the spindle shaft 28 and the output sleeve 30 can be tilted relative to one another Transverse forces and bending moments in the actuator assembly 12 can be avoided by such a relative movement. This is explained hereinafter by way of FIG. 2.

FIG. 2 illustrates schematically the vehicle brake 10 in the actuated state in which the actuating slide 24 pushes the brake pad 20 against the brake rotor 18, so that an axial feed force acts in the vehicle brake 10.

The axial feed force causes transverse forces and bending moments in the actuator assembly 12 such that a certain deformation of the brake caliper 14 takes place. The deformation of the brake caliper 14 is shown in an exaggerated manner in FIG. 2 for clearer illustration. Generally, the brake caliper 14 deflects by up to 1°.

In an exemplary embodiment, a deflection of 0.9° is achieved with a feed force of 65 kN.

Such a deflection is disadvantageous, however, since it can lead to increased wear due to the bending moment which occurs.

This disadvantageous effect is avoided by the separation of the spindle shaft 28 and the output sleeve 30 according to the invention.

This is achieved by the spindle shaft 28 being aligned with the brake caliper 14, optionally jointly with a bearing bush, while the output sleeve 30 is aligned with the brake rotor 18 jointly with the actuating slide 24.

The gear unit 36 is also aligned with the brake caliper 14 such that the deformation of the brake caliper 14 is not transmitted into the gear unit 36.

As a result, the components of the actuator assembly 12 can be adapted to a deformation of the brake caliper 14, without the occurrence of greater transverse forces.

Figure 3:
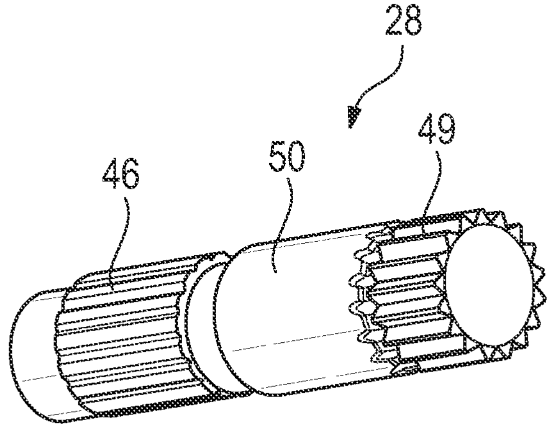
FIG. 3 shows a spindle shaft of a spindle drive.
Figure 4:
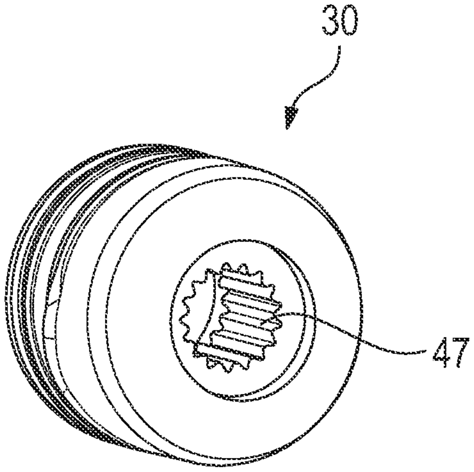
FIG. 4 shows an output sleeve of the spindle drive.

The possibility that the spindle shaft 28 and the output sleeve 30 can be tilted relative to one another is provided by the geometry illustrated in FIGS. 3 and 4.

As can be seen in FIG. 3, the spindle shaft 28 has an external toothing 46 in the region of the output sleeve 30. The output sleeve 30 has an internal toothing 47 (see FIG. 4).

The external toothing 46 of the spindle shaft 28 is of crowned configuration, such that the output sleeve 30 and the spindle shaft 28 can be tilted relative to one another.

The internal toothing 47 is of straight configuration.

It is possible to compensate for a radial and an axial offset between the spindle shaft 28 and the output sleeve 30 by the external toothing 46 which is of crowned configuration.

A further toothing 49 on the axial end of the spindle shaft 28 serves for coupling to the gear unit 36.

The axial positioning of the output sleeve 30 on the spindle shaft 28 takes place by means of two flexible rings 48 which adjoin the output sleeve 30 on both sides thereof. In practice, the output sleeve 30 is specifically clamped axially without clearance between the rings 48.

The two flexible rings 48 are positively fastened to the spindle shaft 28.

One of the two rings 48 is arranged in an associated peripheral recess 50 (see FIG. 4).

Figure 5:
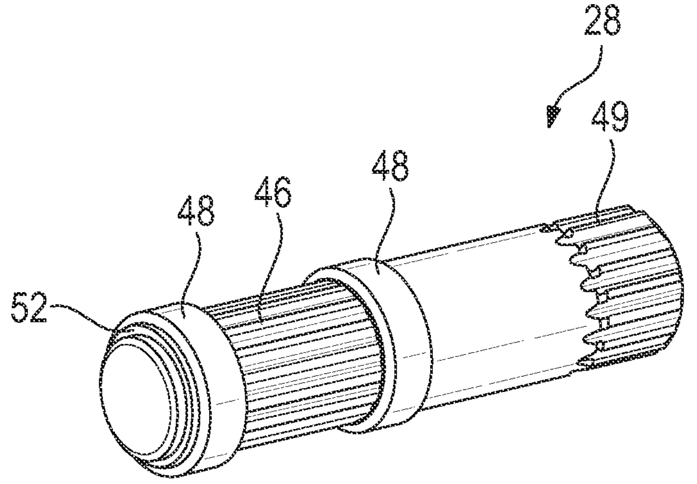
FIG. 5 shows the spindle shaft with the positioning elements.
Figure 6:
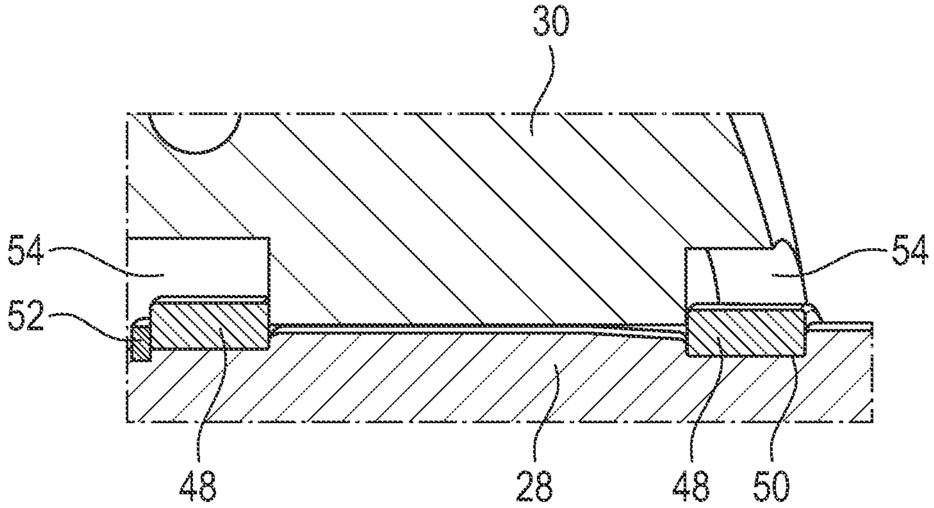
FIG. 6 shows the actuator assembly in the region of an output sleeve of a spindle drive.

The second ring 48 is axially held by means of a locking ring 52, as shown in FIGS. 5 and 6.

When the spindle shaft 28 is tilted relative to the output sleeve 30, the flexible rings 48 are resiliently compressed.

As can be seen in FIG. 6 recesses 54, in which the flexible rings 48 are arranged, are present in the output sleeve 30 on the front face Thus the flexible rings 48 are arranged so as to be axially overlapping with the output sleeve 30 and do not protrude beyond the output sleeve 30. In this manner, a compact design is achieved. In particular, a length of the spindle 26 can be reduced thereby.

The invention claimed is:

1. An actuator assembly (12) for an electromechanical vehicle brake (10), having a brake caliper (14) in which an intermediate space (16) is present for receiving a brake rotor (18), a ball screw drive which has an actuating slide (24) for applying a brake pad (20) onto the brake rotor (18) and an electromotively driven spindle (26) for the axial movement of the actuating slide (24), wherein the actuating slide (24) can be moved by axial displacement between an extended position and a retracted position, wherein the spindle (26) has a spindle shaft (28) and an output sleeve (30) which is separate from the spindle shaft (28) and which is arranged in toothed and torque-transmitting engagement on the spindle shaft (28), in the region of the output sleeve (30) the spindle shaft (28) having an external toothing (46) and the output sleeve (30) having an internal toothing (47), the external toothing (46) of the spindle shaft (28) being of crowned configuration, such that the output sleeve (30) and the spindle shaft (28) can be tilted relative to one another, wherein a threaded raceway (32) is formed on the external peripheral surface of the output sleeve (30) and an opposing raceway (34) for balls is formed on the internal peripheral surface of the actuating slide (24).

2. The actuator assembly (12) as claimed in claim 1, wherein a flexible ring (48) adjoining the output sleeve (30) is arranged on both sides of the output sleeve (30).

3. The actuator assembly (12) as claimed in claim 2, wherein the flexible rings (48) are positively fastened to the spindle shaft (28).

4. The actuator assembly (12) as claimed in claim 3, wherein the flexible rings (48) are axially held in a positive manner in one respectively assigned peripheral recess (50) and/or by means of a locking ring (52), and can be resiliently compressed when the spindle shaft (28) is tilted relative to the output sleeve (30).

5. The actuator assembly (12) as claimed in claim 2, wherein the output sleeve (30) is clamped axially without clearance between the rings.

6. The actuator assembly (12) as claimed in claim 1, wherein the output sleeve (30) is axially supported via an axial bearing (40) on the brake caliper (14) or on a housing fastened to the brake caliper (14), wherein an intermediate element (42) is arranged between the axial bearing (40) and the output sleeve (30), the intermediate element having on a side facing toward the output sleeve (30) a spherically shaped surface (44) against which the output sleeve (30) bears.

7. The actuator assembly (12) as claimed in claim 6, wherein a central point of the spherical surface (44) is located in the intermediate space (16) for receiving the brake rotor (18).

8. The actuator assembly (12) as claimed in claim 1, wherein the spindle shaft (28) is radially supported by means of a slide bearing (38) on the brake caliper (14) or on a housing fastened to the brake caliper (14).

9. An actuator assembly (12) for an electromechanical vehicle brake (10), comprising:

a brake caliper (14) in which an intermediate space (16) is present for receiving a brake rotor (18), a ball screw drive which has an actuating slide (24) for applying a brake pad (20) onto the brake rotor (18) and an electromotively driven spindle (26) for the axial movement of the actuating slide (24), wherein the actuating slide (24) can be moved by axial displacement between an extended position and a retracted position, wherein the spindle (26) has a spindle shaft (28) and an output sleeve (30) which is separate from the spindle shaft (28) and which is arranged in toothed and torque-transmitting engagement on the spindle shaft (28), in the region of the output sleeve (30) the spindle shaft (28) having an external toothing (46) and the output sleeve (30) having an internal toothing (47), the external toothing (46) of the spindle shaft (28) being of crowned configuration, such that the output sleeve (30) and the spindle shaft (28) can be tilted relative to one another, wherein a threaded raceway (32) is formed on the external peripheral surface of the output sleeve (30) and an opposing raceway (34) for balls is formed on the internal peripheral surface of the actuating slide (24), wherein an electric motor is coupled in terms of drive to the spindle shaft (28) via a gear unit (36) in order to rotate the spindle shaft (28), for moving the actuating slide (24) between the retracted position and the extended position.

10. The actuator assembly (12) as claimed in claim 9, wherein a flexible ring (48) adjoining the output sleeve (30) is arranged on both sides of the output sleeve (30).

11. The actuator assembly (12) as claimed in claim 10, wherein the flexible rings (48) are positively fastened to the spindle shaft (28).

12. The actuator assembly (12) as claimed in claim 11, wherein the flexible rings (48) are axially held in a positive manner in one respectively assigned peripheral recess (50)

and/or by means of a locking ring (52), and can be resiliently compressed when the spindle shaft (28) is tilted relative to the output sleeve (30).

13. The actuator assembly (12) as claimed in claim 10, wherein the output sleeve (30) is clamped axially without clearance between the rings.

14. The actuator assembly (12) as claimed in claim 9, wherein the output sleeve (30) is axially supported via an axial bearing (40) on the brake caliper (14) or on a housing fastened to the brake caliper (14), wherein an intermediate element (42) is arranged between the axial bearing (40) and the output sleeve (30), the intermediate element having on a side facing toward the output sleeve (30) a spherically shaped surface (44) against which the output sleeve (30) bears.

15. The actuator assembly (12) as claimed in claim 14, wherein a central point of the spherical surface (44) is located in the intermediate space (16) for receiving the brake rotor (18).

16. The actuator assembly (12) as claimed in claim 9, wherein the spindle shaft (28) is radially supported by means of a slide bearing (38) on the brake caliper (14) or on a housing fastened to the brake caliper (14).

* * * * *